S. A. DEZALL.
VEHICLE ATTACHMENT.
APPLICATION FILED JUNE 14, 1920.
1,436,017. Patented Nov. 21, 1922.
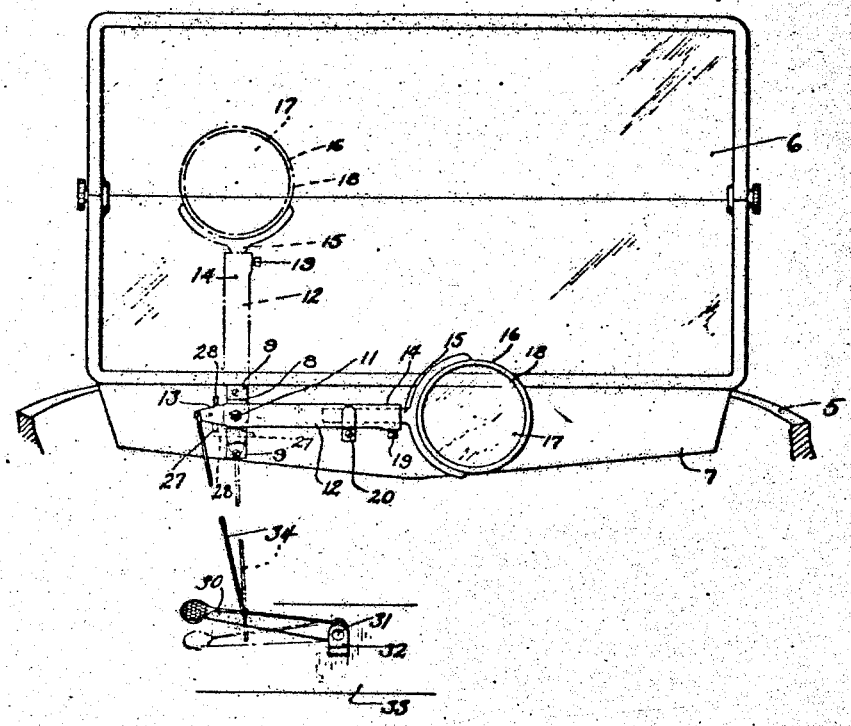
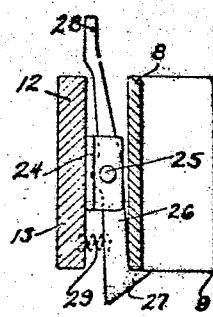
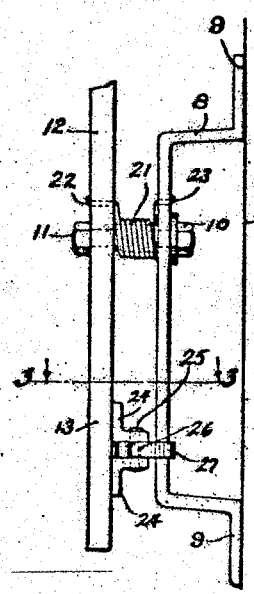
Inventor
Samuel A. Dezall.
By Morrill & Kinney
Attorneys Patented Nov. 21, 1922.

1,436,017

UNITED STATES PATENT OFFICE.

SAMUEL A. DEZALL, OF DELAFIELD, WISCONSIN.

VEHICLE ATTACHMENT.

Application filed June 14, 1920. Serial No. 388,938.

*To all whom it may concern:*

Be it known that I, SAMUEL A. DEZALL, a citizen of the Dominion of Canada, and resident of Delafield, in the county of Waukesha and State of Wisconsin, have invented new and useful Improvements in Vehicle Attachments, of which the following is a description, reference being had to the accompanying drawings, which are a part of this specification.

The present invention relates to certain new and useful improvements in vehicle attachments and has for one of its objects to provide a device movable into and out of the operator's line of vision to modify any blinding or glaring rays of light that may be encountered.

Oftentimes, an operator of a machine driving at night will be blinded by the headlight of an oncoming machine causing the operator to drive his machine into a ditch and perhaps colliding with the oncoming machine. Also at times the sun's rays will be in such a position as to blind the vehicle operator causing him to run off the road and possibly wrecking the machine.

Hence with the above and other objections in mind, this invention has for another object to provide a light modifying device of simple construction which may be instantly moved to a position within the line of vision of the operator to modify and eliminate the blinding rays of light so that the operator may continue the operation of his machine with safety.

A further object of the present invention is to provide a light modifying device of the class described formed of colored translucent material and normally urged to a position out of the operator's line of vision but readily movable into the operator's line of vision and having means for releasably securing the same in such position.

A still further object of this invention is to provide a device of the class described which will be of neat and ornamental appearance, will occupy a comparatively small amount of space, and which is capable of ready attachment to machines either at the time of their manufacture or to the machines now in use.

With the above and other objects in view which will appear as the description proceeds, my invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawing I have illustrated one complete example of the physical embodiment of my invention constructed according to the best mode I have so far devised for the practical application of the principles thereof, and in which:

Figure 1 is a view of a portion of a dashboard of a motor vehicle equipped with my invention;

Figure 2 is a fragmentary view looking toward the securing bracket from the right with reference to Figure 1, the light modifying member carrying arm being illustrated as in upright position with the modifying device in the operator's line of vision; and Figure 3 is a view taken transversely through the securing bracket and light modifying member carrying arm on the plane indicated by the line 3—3 of Figure 2.

Referring now more particularly to the accompanying drawing, the numeral 5 designates generally a body of a vehicle, 6 the usual wind shield, and 7 the dash or instrument board to which my device is preferably attached.

My device consists of a securing bracket member 8 having opposite directed arms 9 secured to the board 7 in any desired manner. The bracket member 8 has secured thereto as at 10 near its uppermost end a pivot bolt 11, upon which is swingingly mounted a supporting arm 12. The supporting arm 12 has its lowermost end extended slightly beyond the pivot bolt as at 13, and its upper end 14 is recessed or grooved to adjustably receive a supporting stem 15 of a light modifying device 16.

The light modifying device consists of a member 17 of colored translucent material such as glass, isinglass, or the like, preferably of orange color and secured in a frame 18 carried by the stem 15. The stem 15 is adjustably secured in place by a set screw 19, and as will be readily apparent, the device 16 is moved toward or away from the pivot bolt 11 to adjust the same to best suit the height of the operator.

When not in use, and out of the line of vision of the operator, the arm 12 is in a substantially horizontal position, engaged with in a spring clip 20 to prevent rattling thereof. The arm 12 is normally yieldingly urged to its position within the spring clip by an expansile spring 21 coiled about the pivot bolt 11 intermediate the arm and bracket member with one end thereof engaging the arm 12 as at 22 and its other end engaging the bracket member 8 as at 23. This construction at all times yieldingly urges the arm 12 and with it the modifying device to its full line position depicted in Figure 1 with the light modifying device out of the operator's line of vision.

If desired, the arm 12 may be swung by hand to position the light modifying device in the operator's line of vision, with the arm 12 in upright position, and I provide means for readily releasably securing the arm in upright position against the action of spring 21. The end 13 of the arm has a bracket member 24 secured thereto and formed of two opposed angled plates between which is pivoted as at 25 a latch member 26, having an end 27 shaped to engage the right side or edge of the bracket member and thus hold the arm 12 against movement under action of spring 21. The other end 28 of the latch 26 provides a finger engaging portion for releasing the latch from engagement with the bracket member. Said latch is normally urged to engagement with the bracket member by an expansile spring 29 positioned between the arm 12 and the latch member 26.

For the convenient and ready operation of the device, I provide a foot pedal 30 having one end pivoted as at 31 in a bracket 32 secured to the floor board 33 near the driver. The pedal 30 is connected with the end 13 of the arm 12 by a connecting link or rod 34 so that a depression of the pedal will swing the outer end of the arm 12 to an upright position with the light modifying device in the operator's line of vision.

Upon the arm 12 reaching its upright position, the latch portion 27 of the member 26 will engage behind the adjacent side of the bracket 28 and thus secure the device in position, and when it is desired to move the device to its inoperative position, the end 28 of the latch 26 is depressed when the arm 12 will instantly move under action of its spring 21 to its full line position depicted in Figure 1.

What I claim as my invention is:

1. A device of the class described comprising a normally horizontally positioned arm pivoted to a support, a spring clip in which said arm may lie when in said position, a spring normally urging said arm into said clip, a foot pedal, a link connecting said pedal to one end of said arm, and a light modifying member mounted on the opposite end of said arm, whereby upon depressing said pedal, said arm may be swung to a substantially vertical position for the purpose described.

2. A device of the class described comprising a bracket member fixed to a support adjacent the wind shield, a normally horizontally positioned arm member pivoted to said bracket member, a spring clip in which said arm may lie when in said position, a spring normally urging said arm into said clip, a foot pedal, a link connecting said pedal to one end of said arm member, a light modifying element mounted on the opposite end of said arm member, whereby upon depressing said pedal said arm member may be swung to a substantially vertical position, and a latch pivoted on one of said members and adapted to operatively engage the other of said members when the arm member is swung to its vertical position for the purpose described.

In testimony whereof, I affix my signature.

SAMUEL A. DEZALL.